United States Patent [19]

Andersson

[11] Patent Number: 4,653,703

[45] Date of Patent: Mar. 31, 1987

[54] LOCKING DEVICE FOR VEHICLE SAFETY BELTS

[75] Inventor: Tommy Andersson, Alingsas, Sweden

[73] Assignee: Autoliv Development AB, Vargarda, Sweden

[21] Appl. No.: 776,040

[22] PCT Filed: Nov. 14, 1984

[86] PCT No.: PCT/SE84/00387

§ 371 Date: Aug. 20, 1985

§ 102(e) Date: Aug. 20, 1985

[87] PCT Pub. No.: WO85/02152

PCT Pub. Date: May 23, 1985

[30] Foreign Application Priority Data

Nov. 17, 1983 [SE] Sweden .................................. 8306333

[51] Int. Cl.⁴ ............................................. B60R 22/36
[52] U.S. Cl. ............................................. 242/107.4 R
[58] Field of Search .................. 242/107.4 R–107.4 E, 242/99; 280/803, 806–808; 297/475–478

[56] References Cited

U.S. PATENT DOCUMENTS 2,825,581 3/1958 Knight ...................... 242/107.4 A X
4,150,799 4/1979 Takada ......................... 242/107.4 A
4,366,934 1/1983 Seifert et al. ................. 242/107.4 A

FOREIGN PATENT DOCUMENTS 0112033 6/1984 European Pat. Off. ..... 242/107.4 A

Primary Examiner—John M. Jillions
Attorney, Agent, or Firm—Spencer & Frank

[57] ABSTRACT

A locking device for vehicle safety belts of the type in which a band of the belt is automatically wound onto a shaft (14) rotatably mounted between two side walls (12, 13) of a support, when the belt is not used, comprises two notched wheels (22, 23) attached to the shaft, and at least one moveable locking bar (32, 33). The locking bar is adapted to cooperate with the notched wheels (22, 23) for locking the shaft and to be moved between a passive position in which it is positioned outside the rotation paths of the notches, and an active position in which it runs into the rotation paths of the notches, so that the rotation of the notched wheels and thus of the shaft is prevented and further band cannot be withdrawn from the shaft. The notched wheels (22, 23) are positioned adjacent one side wall (13) on either side of the wall and the locking bar (32, 33) is adapted to pass through an aperture in the wall. This will give a solution to the problem of providing a support with a locking device for safety belts having a small size and a low weight, but nevertheless achieving a good distribution and carrying of the forces. A particular embodiment uses two locking bars (32, 33) positioned diametrically in relation to the shaft, so that the force to be carried is distributed over four engagement points.

9 Claims, 3 Drawing Figures

LOCKING DEVICE FOR VEHICLE SAFETY BELTS

BACKGROUND OF THE INVENTION

The present invention relates to a locking device for vehicle safety belts, particularly for motor cars, of the type in which a band of the belt is automatically wound onto a rotatably mounted shaft by means of a spring, when the belt is not used. The locking device is adapted to lock the shaft onto which the band is wound, so that the band cannot be further withdrawn from the shaft, and is intended to start operation due to the movements of the vehicle or due to rapid withdrawal of band from the shaft, so that a person who is embraced by the safety belt is reliably retained in case of danger.

Locking devices of the type set forth above are previously known. In the known devices, the shaft onto which the band of the belt is wound is rotatably mounted between two side walls of a support carrying the safety belt. The locking device for the shaft may comprise two notched wheels rigidly attached to the shaft and a moveable locking bar adapted to cooperate with the notched wheels for locking the shaft. The locking bar is moveable between a passive position, in which the locking bar is positioned outside the paths of rotation of the wheel notches, and an active position, in which the locking bar at least partially runs into the paths of rotation of the notches, so that rotation of the notched wheels and thus also of the shaft is prevented, thus preventing further withdrawal of band from the shaft.

Locking devices of the type set forth above in which only one notched wheel is attached to the rotatably mounted shaft are also previously known, but the use of two notched wheels has the advantage that the tractive force in the band to be transferred to the support can be transferred symmetrically to both ends of the locking means. This will facilitate the transfer of the force from the shaft to the support and therefore also the design and mounting of the locking means.

In the prior art devices having two notched wheels rigidly attached to the shaft, the notched wheels have been positioned adjacent different ones of the side walls in which the shaft is mounted and between which the band of the safety belt is wound onto the shaft. A device of this type is disclosed in the British Patent Specification No. 1 418 373. However, in such a device the locking bar must be positioned at a comparatively large distace from the coiling shaft, because the locking bar must be positioned outside the outermost turn of the coil formed on the shaft, when the band is maximally wound onto the shaft, i.e. when the safety belt is not used. Furthermore, the locking bar must have a length corresponding to the distance between the sidewalls, and the notched wheels must have a radius approximately corresponding to the distance between the axis of the shaft and the locking bar. A support for a safety belt having a locking device of this type will therefore have a comparatively large size and high weight.

SUMMARY OF THE INVENTION

The main object of the invention is to provide a locking device for safety belts of the type set forth above, the device enabling the advantageous use of two notched wheels rigidly attached to the shaft, the wheels cooperating with at least one locking bar for locking the shaft, the device considerably reducing the size as well as the weight of the supports of the safety belts as compared with what has been possible in prior locking devices having two notched wheels attached to the coiling shaft.

The invention provides a locking device for a vehicle safety belt of the type in which a band of the safety belt is automatically wound on to a shaft, rotatably mounted between two side walls of a support for the safety belt, when the belt is not used, for locking the shaft, comprising two notched wheels attached to the shaft, and at least one movable locking bar located to cooperate with the notched wheels for locking the shaft and to be moved between a passive position in which the locking bar is positioned outside the rotation paths of the notches of the notched wheels, and an active position in which at least a portion of the locking bar runs into the rotation bars of the notches, so that the rotation of the notched wheels and thus of the shaft is prevented, preventing further withdrawal of band from the shaft, characterised in that the notched wheels are positioned adjacent one side wall on either side of the side wall, said side wall defining an aperture, and in that the locking bar is located to pass through the said aperture in the side wall, the locking bar being mounted in the aperture in such a way that it, in its active position, engages with notches on both wheels simultaneously and then transfers the tractive force in the band to the side wall of the support.

Due to the fact that the notched wheels are positioned adjacent one of the side walls on either side of this wall and the locking bar is adapted to pass through an aperture in the side wall, the notched wheels can be made small and light, because the locking bar can be positioned close to the coiling shaft. Furthermore, the locking bar can be made very short, because the notched wheels are positioned close to each other. These conditions will reduce the size as well as the weight of the support for the safety belt. A further advantage of the locking device according to the invention is that two locking bars can be used and that these locking bars can be positioned diametrically in relation to the shaft without necessitating an increased size of the support and without or with only an insignificant increase of the weight. The use of two locking bars, which preferably are positioned diametrically in relation to the shaft, will give a symmetrical distribution of the force with four engagement points and will facilitate the carrying of the forces in the support.

BRIEF DESCRIPTION OF THE DRAWINGS

One embodiment of a locking device according to the invention will now be further described below with reference to the accompanying drawings.

DESCRIPTION OF THE PREFERRED EMBODIMENT

Figure 1:
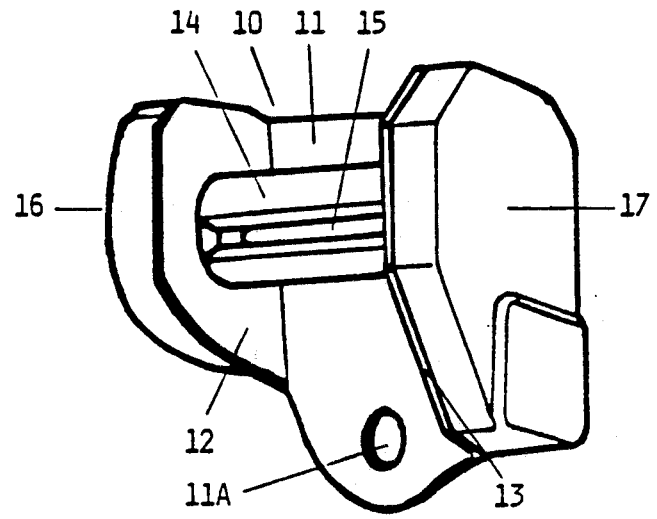
FIG. 1 is a diagrammatic perspective view of a support with side wall covers for a motor car safety belt.

The support 10 for a safety belt shown in FIG. 1 comprises a base plate 11 with an aperture 11A for a mounting screw and two side walls 12,13. A shaft 14 for coiling a band in the safety belt is rotatably journaled in the side walls and is provided with a through aperture 15 into which the band end can be inserted and attached in a conventional manner. The coiling shaft 14 is provided with a helical spring (not shown) at the side wall 12. The helical spring is positioned under a cover 16 and is adapted to be tensioned when the band is withdrawn from the coiling shaft 14 and to rewind the band onto the shaft automatically, when the belt is not used. The locking device for locking the coiling shaft is positioned at the side wall 13 under a cover 17. The rotatably mounted coiling shaft 14 and the helical spring for widing the band onto the shaft automatically are of a conventional type. The locking device for the coiling shaft will be described more in detail below in connection with FIGS. 2 and 3.

Figure 2:
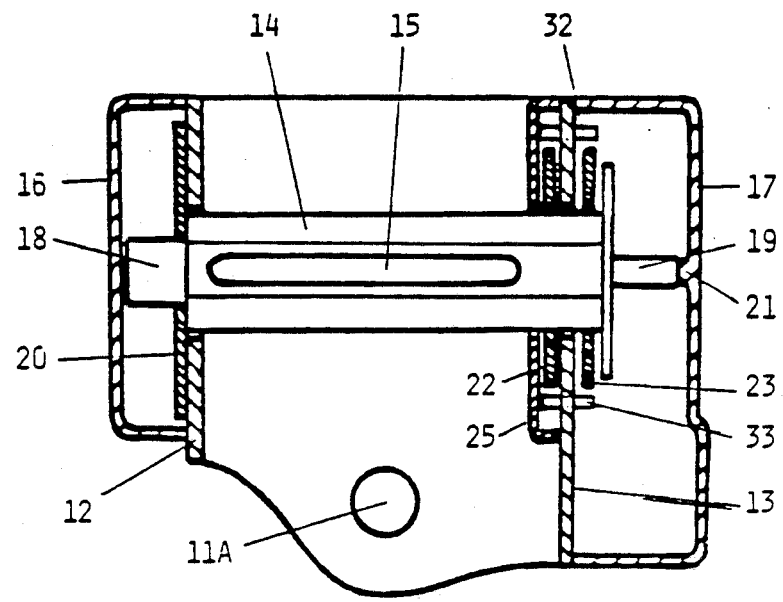
FIG. 2 is a cross section through the support shown in FIG. 1.

FIG. 2 shows the support according to FIG. 1 in cross-section. The ends of the rotatably mounted shaft 14 pass into apertures in the side walls 12,13. The ends are provided with projecting pivots 18,19. The pivot 18 to the left in FIG. 2 is rotatably mounted in a plastics disk 20 attached to the side wall 12 adjacent the helical spring (not shown) under the cover 16. The pivot 19 to the right in FIG. 2 is mounted on a projection 21 that passes into a recess in the end of the pivot. The projection 21 is positioned on the inside of the side wall cover 17.

The shaft 14 passes through the apertures in the side walls with a play and, thus, is normally journalled in the plastics disk 20 and mounted on the projection 21. When the band of the safety belt is heavily loaded, e.g. when a person embraced by the safety belt is thrown forward in the vehicle in a collision, the shaft will be displaced, so that the shaft will come into contact with the side walls 12,13. The side walls will then directly take up the occurring forces. This type of bearing will give less friction during normal use of the safety belt and therefore provide a higher comfort for the user.

Figure 3:
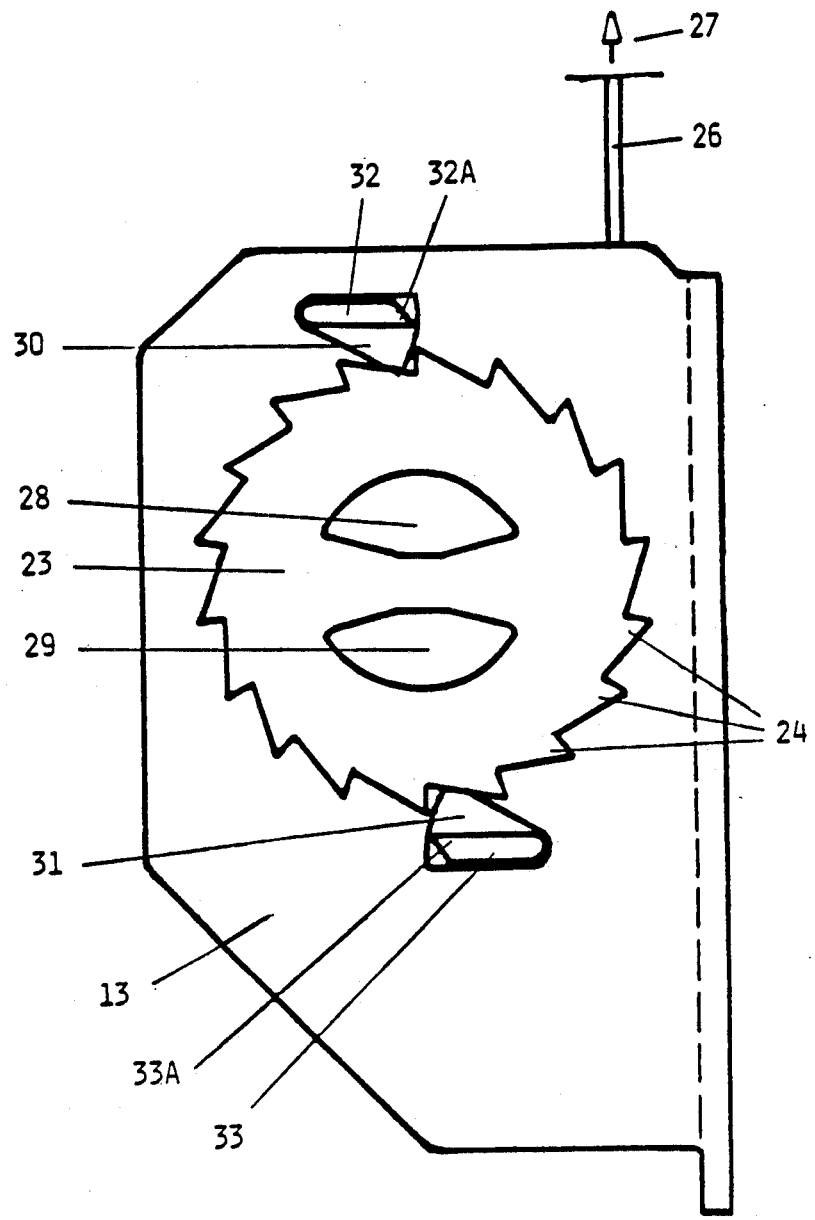
FIG. 3 is a side view of the support according to FIG. 1 without the side wall cover and with the control mechanism for the locking bars removed.

At the side wall 13 the shaft 14 is provided with two wheels 22,23 rigidly attached to the shaft. The wheels are provided with a number of notches 24 at their peripheries, as shown in FIG. 3, and positioned on either side of the side wall 13. The notched wheels are adapted to cooperate with two locking bars 32,33, as more clearly shown in FIG. 3. The notched wheel positioned on the inside of the side wall 13 is covered by a protecting plate 25, so that the band (not shown) coiled on the shaft 14 cannot touch the notched wheel.

FIG. 3 shows the support for the safety belt as seen from the side with the side wall cover 17 removed. In this view a portion of the band 26 of the safety belt is shown, the withdrawal direction of the band being indicated by the arrow 27. The notched wheel 23 is provided with two apertures 28,29, and two projections on the shaft 14 pass into the apertures, so that the notched wheel cannot be turned in relation to the shaft. The notched wheel 22 is not shown in FIG. 3, because the wheel is positioned behind the side wall 13. However, the wheel is designed in exactly the same way as the notched wheel 23 and is also attached to the shaft so that it cannot be turned in relation to the shaft 14. Two apertures 30,31 are provided in the side wall 13, and in each aperture a locking bar 32 and 33, respectively, is mounted. The apertures 30,31 substantially have the shape of a circular sector, and the locking bars are adapted to be displaced between a passive position, in which the locking bars are positioned outside the paths of rotation of the wheel notches, and an active position, in which the locking bars with at least a portion pass into the paths of rotation of the notches, so that the rotation of the notched wheels and thus of the shaft is prevented. At the edge intended to engage with the notched wheels the locking bars are shaped to a front 32A,33A for a reliable engagement with the front edge of a notch 24. In FIG. 3 the locking bars 32,33 are shown in their passive positions.

The locking bars 32,33 are positioned diametrically in relation to the shaft 14, and the fronts 32A,33A of the locking bars are positioned on a line substantially parallel with the withdrawal direction of the band indicated by means of the arrow 27 in FIG. 3. This arrangement will provide the most favourable carrying of the forces in the side wall 13. The locking bars 32,33 have a length that is substantially equivalent to the distance between the farthest sides of the notched wheels 22,23, as shown in FIG. 2. The length of the locking bars here means the effective portion, i.e. the length excluding any projecting portion necessary for the control.

The locking bars are guided to the passive position or the active position by means of a guiding disk (not shown). The guiding disk is provided on the shaft or concentrically with the start in such a way that the shaft can rotate without driving the guiding disk during the rotation. The guiding disk can be turned in relation to the locking bars, so that the locking bars can be swung between the separate positions. The swinging movement of the guiding disk can be provided by connecting the guiding disk to the shaft, so that the disk is caused to follow the shaft during its rotation. This connection can be provided either by means of an inertia wheel rotatably mounted on the shaft, the wheel being actuated by a rapid withdrawal of band, or by means of a separate inertia means that is dependent on the movements of the vehicle. Connecting means of this type are previously known, e.g. through the U.S. Pat. No. 4,167,254, and therefore have not been described in detail in this context.

When a person is embraced by the safety belt and the vehicle is running smoothly, the locking bars are in their passive positions, so that band can be withdrawn from the coiling shaft and the person embraced by the safety belt thus can move in the safety belt. When the vehicle is braked or turned heavily or the person embraced by the safety belt is moving rapidly forwards in the vehicle, one of the provided inertia means will actuate the guiding disk, so that the disk moves the locking bars to their active positions, thus causing the locking bars to engage with the notched wheels, so that the shaft is locked and further band cannot be withdrawn from the coiling shaft. The safety belt will then retain the person embraced by the safety belt.

While only one embodiment of the locking device according to the invention has been described and shown, it is evident that many modifications and variations are possible within the scope of the invention. The notched wheels can e.g. be provided with a number of projections positioned in a ring concentric with the shaft on the side of the wheels facing the side wall, and not along the periphery. Alternatively, another number of locking bars can be used, e.g. only one locking bar. The locking bars and the bearing apertures in the side wall for the locking bars can also be designed in other ways than has been shown and described.

What I claim is:

1. A locking device for a vehicle safety belt of the type in which a band (26) of the safety belt is automatically wound onto a shaft (14), rotatably mounted between two side walls (12,13) of a support (10) for the safety belt, when the belt is not used, for locking the shaft, comprising two notched wheels (22,23) attached to the shaft, and at least one moveable locking bar (32,33) located to cooperate with the notched wheels (22,23) for locking the shaft and to be moved between a passive position in which the locking bar is positioned outside the rotation paths of the notches (24) of the notched wheels (22,23), and an active position in which at least a portion (32A,33A) of the locking bar (32,33) runs into the rotation paths of the notches, so that the rotation of the notched wheels and thus of the shaft is prevented, preventing further withdrawal of band from the shaft, wherein the notched wheels (22,23) are positioned adjacent one side wall (13) on either side of this wall, said wall defining an aperture, and wherein the locking bar (32,33) is located to pass through the aperture (30,31) in the side wall, the locking bar being mounted in the aperture in such a way that it, in its active position, engages with notches (24) on both wheels (22,23) simultaneously and then transfers the tractive force in the band to the side wall of the support.

2. A locking device according to claim 1, wherein two locking bars (32,33) are provided, the locking bars being mounted in separate apertures (30,31) in the side wall (13) and adapted to engage with notches (24) of the notched wheels (22,23) simultaneously.

3. A locking device according to claim 2, wherein the apertures (30,31) of the side wall (13) for the two locking bars (32,33) are positioned diametrically in relation to the shaft (14).

4. A locking device according to claim 3, wherein the two apertures (30,31) of the side wall (13) are positioned on a line substantially parallel with the withdrawal direction (27) of the band (26).

5. A locking device according to claim 1, wherein the notched wheels (22,23) have a diameter that is substantially smaller than the diameter of the band coil, when the band (26) is maximally wound onto the shaft (14).

6. A locking device according to claim 5, wherein the notches (24) are positioned at the periphery of the notched wheels (22,23).

7. A locking device according to claim 1 in which a helical spring for winding the band (26) onto the shaft (14) is positioned adjacent one side wall (12) of the support (10), and wherein the notched wheels (22,23) and the at least one locking bar (32,33) are positioned adjacent the other side wall (13).

8. A locking device according to claim 1, wherein each locking bar (32,33) has a length that is substantially equal to the distance between the farthest sides of the notched wheels (22,23).

9. A locking device according to claim 8, wherein each locking bar (32,33) has ends and, in its active position, engages the notched wheels (22,23) with its ends.

* * * * *